(12) United States Patent
Takahashi et al.

(10) Patent No.: US 9,995,239 B2
(45) Date of Patent: Jun. 12, 2018

(54) ENGINE

(71) Applicants: YANMAR CO., LTD., Osaka (JP); TOYOTA JIDOSHA KABUSHIKI KAISHA, Aichi (JP)

(72) Inventors: Takeshi Takahashi, Osaka (JP); Toshiro Itatsu, Aichi (JP)

(73) Assignees: YANMAR CO., LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 374 days.

(21) Appl. No.: 14/380,667

(22) PCT Filed: Feb. 18, 2013

(86) PCT No.: PCT/JP2013/053801
§ 371 (c)(1),
(2) Date: Aug. 22, 2014

(87) PCT Pub. No.: WO2013/129149
PCT Pub. Date: Sep. 6, 2013

(65) Prior Publication Data
US 2015/0034046 A1 Feb. 5, 2015

(30) Foreign Application Priority Data

Mar. 1, 2012 (JP) ................ 2012-044992

(51) Int. Cl.
*F02D 41/34* (2006.01)
*F02B 39/16* (2006.01)
(Continued)

(52) U.S. Cl.
CPC .............. *F02D 41/34* (2013.01); *F02B 37/00* (2013.01); *F02B 39/16* (2013.01);
(Continued)

(58) Field of Classification Search
CPC ... Y02T 10/144; F02D 41/0007; F02D 23/00; F02D 41/34; F02D 41/009; F02D 41/222; F02B 37/18; F02B 39/16; F02B 37/00
See application file for complete search history.

(56) References Cited

U.S. PATENT DOCUMENTS 6,298,718 B1 * 10/2001 Wang ................. F02D 41/0007
701/100
2009/0055072 A1 * 2/2009 He ..................... F02D 41/0007
701/102
2010/0250101 A1 * 9/2010 Kawabe ............. F02D 41/0007
701/104

FOREIGN PATENT DOCUMENTS

JP 05-011316 A 3/1993
JP 05-077639 3/1993
(Continued)

OTHER PUBLICATIONS

International Search Report for International Application No. PCT/JP2013/053801, dated Sep. 12, 2014, 13 pages.

*Primary Examiner* — Sizo Vilakazi
(74) *Attorney, Agent, or Firm* — Sterne, Kessler, Goldstein & Fox P.L.L.C.

(57) ABSTRACT

An engine of the invention includes an engine main unit having cylinders, an intake line, an exhaust line, a supercharger, a turbo sensor detecting a rotational speed of the supercharger, a control device controlling, based on signal from the turbo sensor, an operating state of the engine main unit that has a correlation with the rotational speed of the supercharger, and a crank angle sensor detecting a rotation angle of a crankshaft. The control device recognizes timings at which the cylinders are in a top dead center state based on detection signals of the crank angle sensor and, also, makes a disconnection judgment for the turbo sensor at non-top dead center timings that are within one combustion cycle of
(Continued)

the engine main unit and at which none of the plurality of cylinders are in a top dead center state.

12 Claims, 9 Drawing Sheets

(51) Int. Cl.
*F02D 41/00* (2006.01)
*F02D 41/22* (2006.01)
*F02B 37/00* (2006.01)
*F02D 23/02* (2006.01)

(52) U.S. Cl.
CPC ....... *F02D 41/0007* (2013.01); *F02D 41/009* (2013.01); *F02D 41/222* (2013.01); *F02D 23/02* (2013.01); *Y02T 10/144* (2013.01); *Y02T 10/40* (2013.01)

(56) References Cited

FOREIGN PATENT DOCUMENTS

| | | | |
|---|---|---|---|
| JP | 06-100154 | A | 12/1994 |
| JP | 2006-023122 | | 1/2006 |
| JP | 2007-205339 | A | 8/2007 |
| JP | 2007205339 | A * | 8/2007 |
| JP | 2007-332793 | A | 12/2007 |
| JP | 2009-127453 | A | 6/2009 |
| JP | 4306703 | B | 8/2009 |
| JP | 4375369 | B | 12/2009 |
| JP | 4478931 | B | 6/2010 |

* cited by examiner

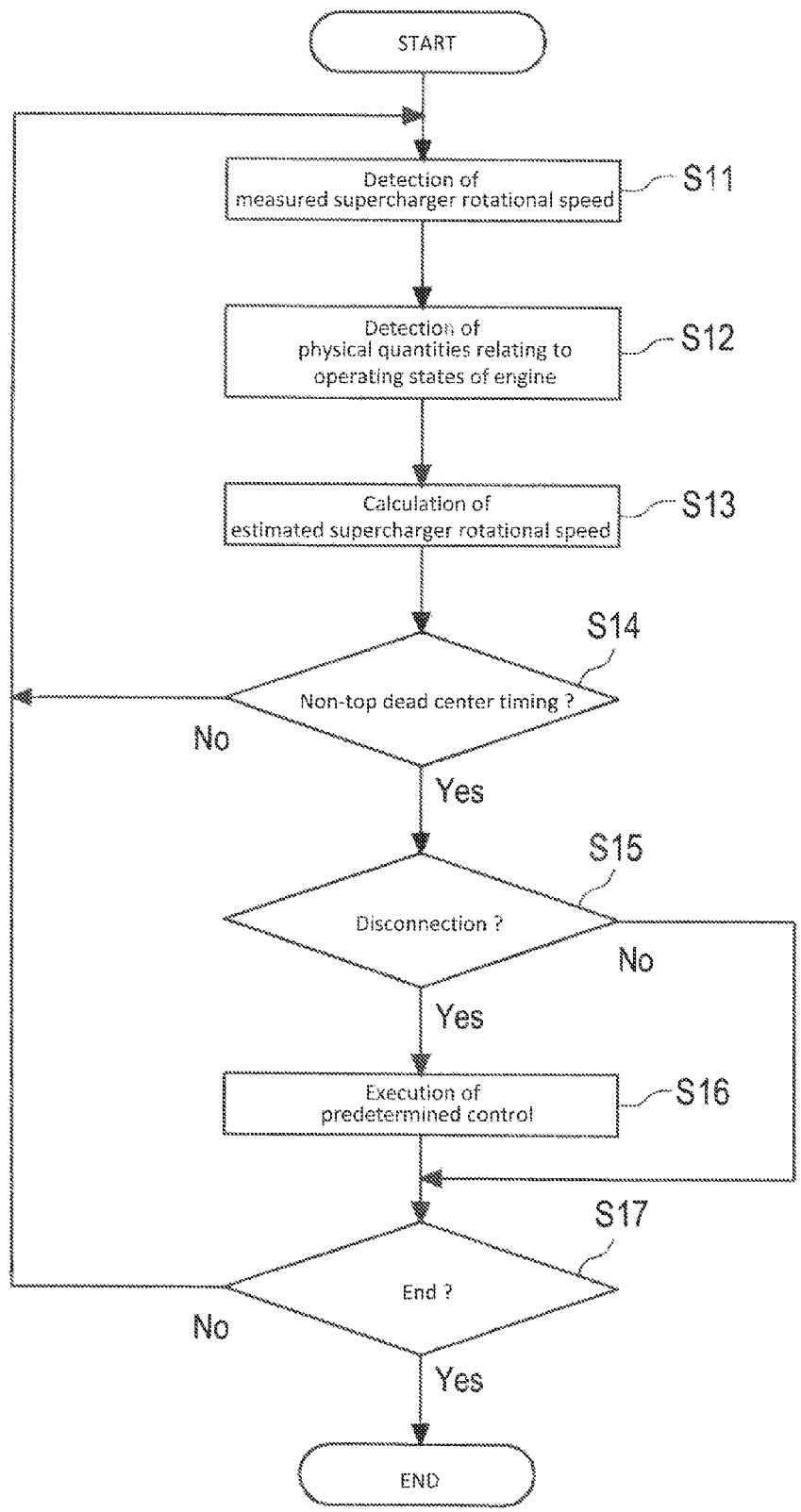

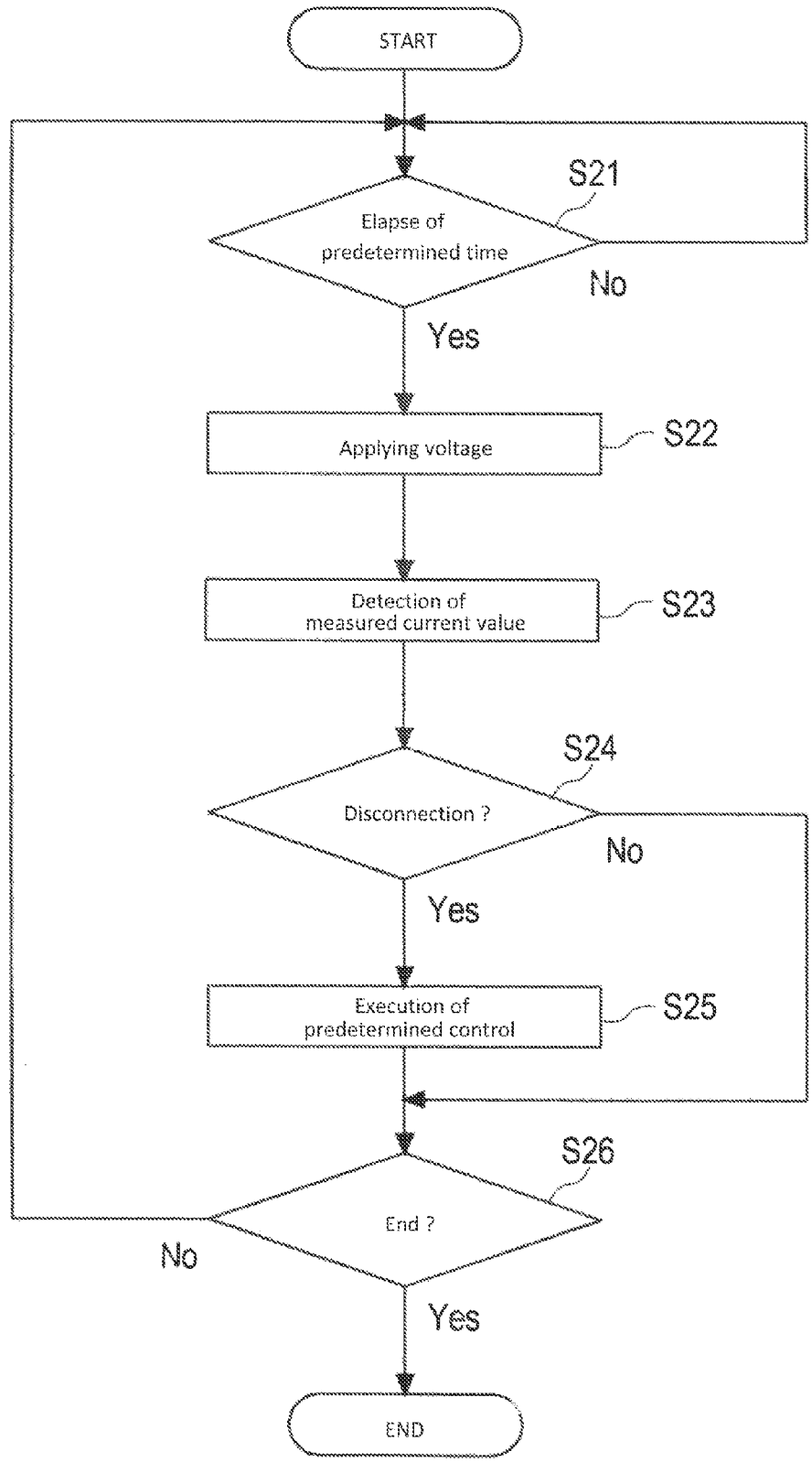

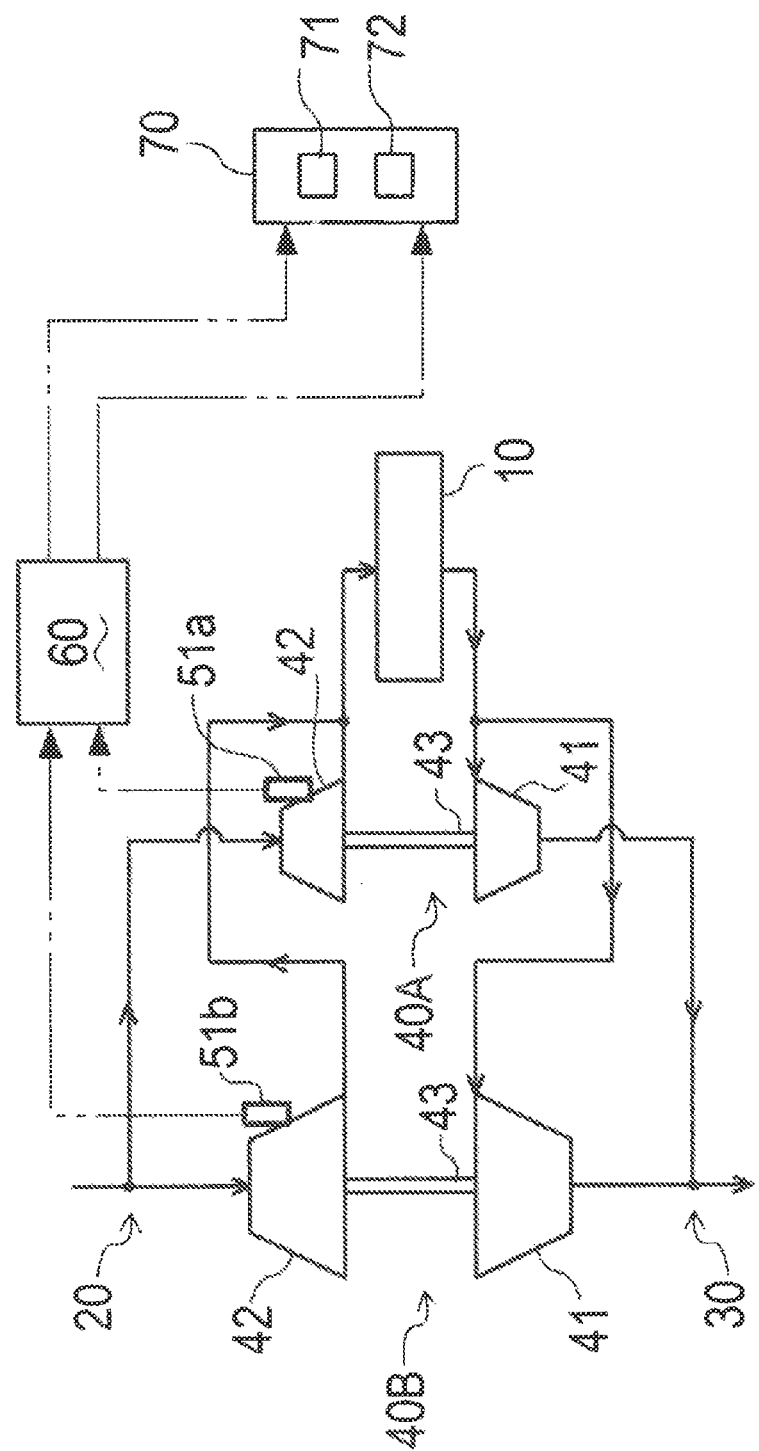

ENGINE

FIELD OF THE INVENTION

The present invention relates to an engine having a supercharger.

BACKGROUND ART

In engines having a supercharger, there have been various proposals to date for providing a turbo sensor that detects the rotational speed of the supercharger and controlling, based on a detection signal from the turbo sensor, an operating state of an engine main unit that has a correlation with the rotational speed of the supercharger (see, for example, Patent Documents 1 to 3).

However, those proposed so far are premised on that the turbo sensor properly operates, and a means that takes a malfunction of the turbo sensor into consideration does not exist.

CITATION LIST

Patent Documents

[Patent Document 1] JP 4478931B
[Patent Document 2] JP 4375369B
[Patent Document 3] JP 4306703B

SUMMARY OF INVENTION

The present invention has been achieved in view of the conventional art described above, and an object thereof is to provide an engine including a supercharger, a turbo sensor for detecting a rotational speed of the supercharger and a control device for controlling, based on a detection signal from the turbo sensor, an operating state of an engine main unit, the engine capable of detecting a malfunction of the turbo sensor while reducing a calculation load on the control device.

In order to achieve the object, the present invention provides an engine that includes an engine main unit having a plurality of cylinders; an intake line for guiding intake air to combustion chambers of the engine main unit; an exhaust line serving as a passage for exhaust gas discharged from the combustion chambers; a supercharger having a turbine placed in the exhaust line and a compressor placed in the intake line so as to be driven by the turbine; a turbo sensor for detecting a rotational speed of the supercharger; a control device for controlling, based on a detection signal from the turbo sensor, an operating state of the engine main unit that has a correlation with the rotational speed of the supercharger; and a crank angle sensor for detecting a rotation angle of a crankshaft, wherein the control device recognizes timings at which the plurality of cylinders are in a top dead center state based on detection signals of the crank angle sensor and, also, makes a disconnection judgment for the turbo sensor at non-top dead center timings that are within one combustion cycle of the engine main unit, and at which none of the plurality of cylinders are in a top dead center state.

The engine according to the present invention makes it possible to effectively detect a malfunction of the turbo sensor while reducing a calculation load on the control device as much as possible.

In a preferable configuration, the crankshaft is provided with a top dead center indicator for indicating a top dead center position of a reference cylinder that serves as a reference among the plurality of cylinders, and a plurality of detectors positioned at equal intervals in a circumferential direction. In this case, the control device recognizes crank angles corresponding to the respective top dead center positions of the plurality of cylinders according to the crank angle corresponding to the top dead center position of the reference cylinder sensed by detection of the top dead center indicator by the crank angle sensor and according to the number of the plurality of cylinders, and, also, recognizes a current crank angle relative to the top dead center position of the reference cylinder by counting the number of the detectors detected by the crank angle sensor from the time of detection of the top dead center indicator and thus recognizes the non-top dead center timings based on the crank angles corresponding to the top dead center positions of the plurality of cylinders and the current crank angle.

In a preferable configuration, in a case where a deviation between the crank angle corresponding to the top dead center position of the cylinder where the latest combustion occurred and the crank angle corresponding to the top dead center position of the cylinder where combustion occurs next is defined as $\Delta\theta$, the control device makes a disconnection judgment for the turbo sensor at a timing at which the current crank angle is positioned within $\Delta\theta/2$ range from the crank angle corresponding to the top dead center position of the cylinder where the latest combustion occurred.

A preferable configuration of the engine according to the present invention may further include engine state detection sensors for detecting physical quantities relating to an operating state of the engine main unit. In this case, the control device has engine operating state/supercharger correlation data for calculating an estimated rotational speed of the supercharger based on the physical quantity detected by the engine state detection sensors, and the control device makes a disconnection judgment for the turbo sensor by comparing an estimated supercharger rotational speed calculated with the engine state detection sensor and the correlation data with a measured supercharger rotational speed obtained with a detection signal of the turbo sensor.

In a preferable configuration of the engine according to the present invention, the crank angle sensor may be used also to function as one of the engine state detection sensors. In this case, the control device has, as the engine operating state/supercharger correlation data, engine/supercharger correlation data for calculating an estimated rotational speed of the supercharger from the rotational speed and the fuel injection amount of the engine main unit detected by the engine state detection sensors, and the control device makes a disconnection judgment for the turbo sensor by comparing the estimated supercharger rotational speed obtained based on signals from the engine state detection sensors and the engine/supercharger correlation data with a measured supercharger rotational speed based on a signal from the turbo sensor.

A preferable configuration of the engine according to the present invention may further include a disconnection judgment circuit that has a predetermined resistance value and is electrically connected to both the control device and the turbo sensor so as to form a closed circuit in cooperation therewith. In this case, the control device is configured to be capable of making, when the main power is ON and the engine main unit is not in operation, a disconnection judgment for the turbo sensor based on whether or not the resistance value of the disconnection judgment circuit is at a predetermined resistance value.

In any one of the various configurations of the engine according to the present invention, the control device may be configured to output an error signal if it senses disconnection of the turbo sensor.

In a case where the control device performs fuel injection amount control for adjusting the amount of fuel injected into the plurality of cylinders based on the rotational speed of the supercharger, as the control of the operating state of the engine main unit that has a correlation with the rotational speed of the supercharger, the control device may be configured to supply a preset amount of fuel in place of the fuel injection amount control that is based on the rotational speed of the supercharger, if the control device senses disconnection of the turbo sensor in a disconnection judgment at a non-top dead center timing.

In a case where the engine further includes engine state detection sensors for detecting physical quantities relating to an operating state of the engine main unit, and the turbo sensor includes first and second turbo sensors, the control device, if it senses disconnection of one of the first and second turbo sensors, preferably may be configured to calculate an estimated rotational speed of the one turbo sensor based on a detection value of the other turbo sensor and detection values of the engine state detection sensors, and treats this calculated rotational speed as the rotational speed of the one turbo sensor that has been sensed as being disconnected.

In a case where the engine further includes engine state detection sensors for detecting physical quantities relating to an operating state of the engine main unit, the control device may be configured to include a storage means for temporarily storing a detection value of the turbo sensor, and also may be configured to, if it senses disconnection of the turbo sensor, calculate an estimated rotational speed based on the latest detection value of the turbo sensor that is stored in the storage means and obtained before sensing of disconnection and detection values of the engine state detection sensors, and regard the estimated rotational speed as a detection value of the turbo sensor.

BRIEF DESCRIPTION OF THE DRAWINGS

FIG. 5 is a flowchart of a disconnection judgment procedure for the turbo sensor carried out when the engine main unit is in operation after start-up.

FIG. 6 is a flowchart of a disconnection judgment procedure for the turbo sensor carried out when the engine main unit is not in operation.

FIG. 7C is a schematic view of an engine according to still another modification of the one embodiment, the engine including first and second superchargers that are arranged in parallel, and first and second turbo sensors that detect the rotational speeds of the first and second superchargers, respectively.

EMBODIMENT FOR CARRYING OUT THE INVENTION

Below, preferable embodiments of an engine according to the present invention will now be described with reference to the attached drawings.

Figure 1:
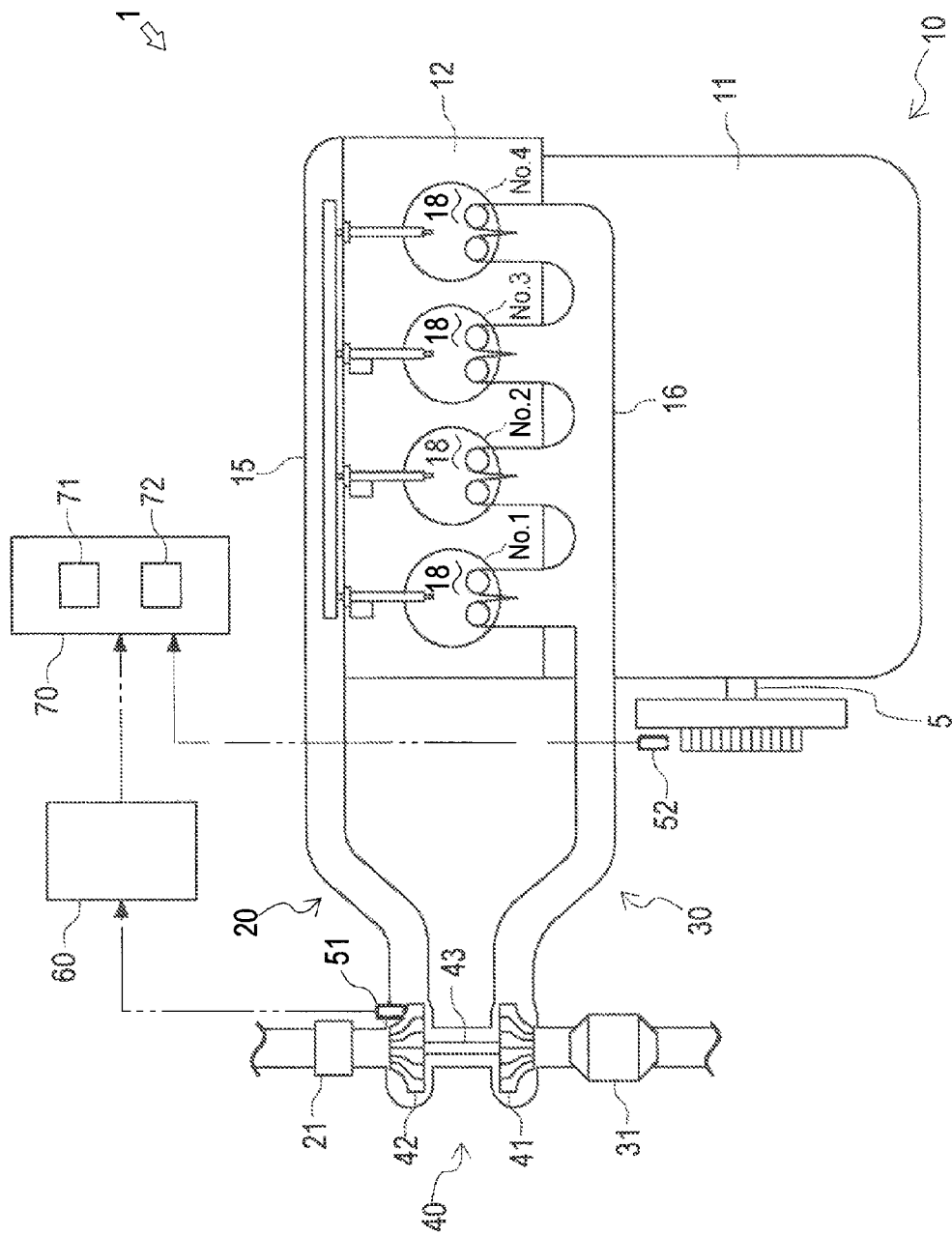
FIG. 1 is a schematic view of an engine according to one embodiment of the present invention.
Figure 2:
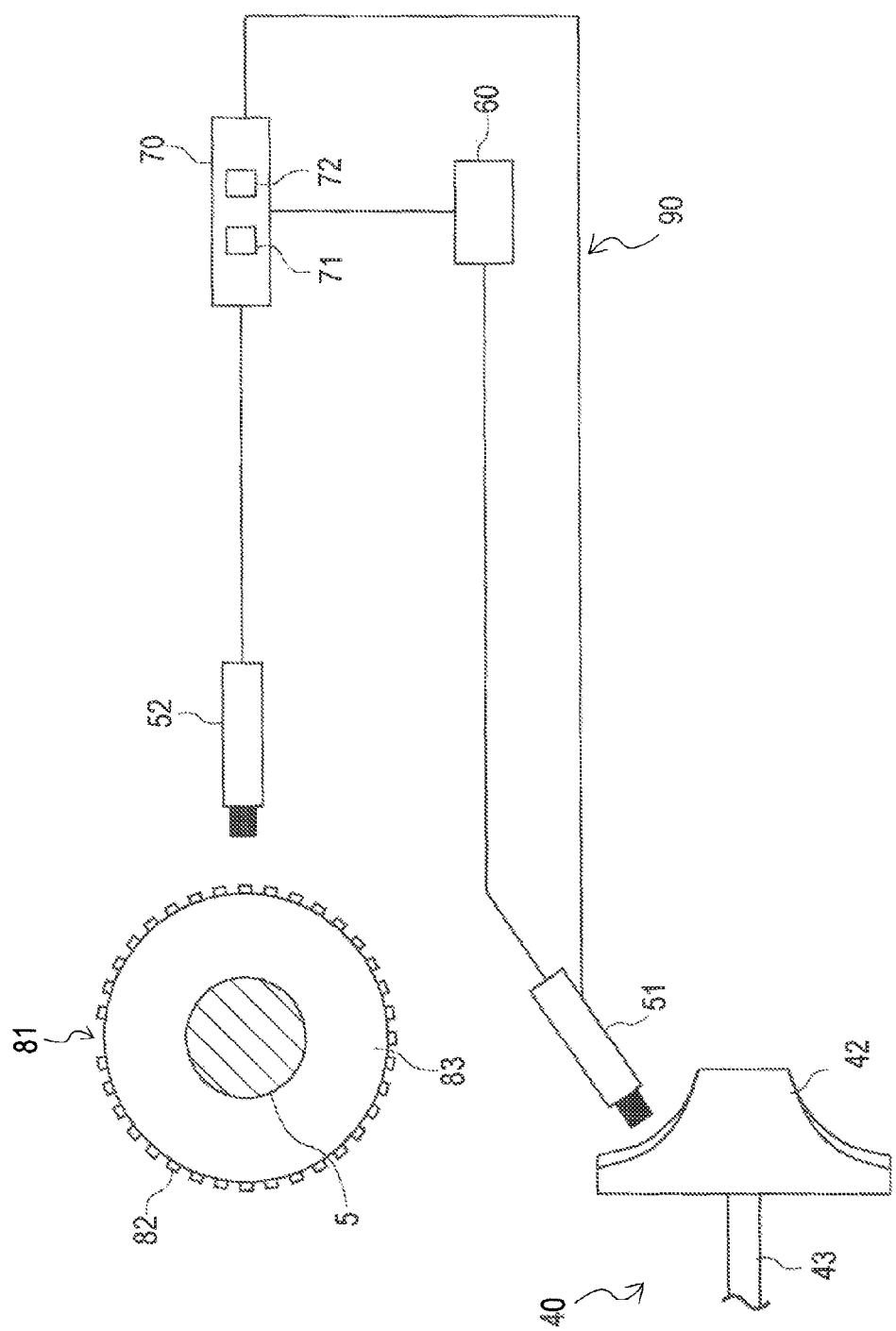
FIG. 2 is a schematic view of a turbo sensor and a crank angle sensor in the engine.

FIG. 1 shows a schematic configuration of an engine 1 according to the present embodiment. FIG. 2 shows a schematic configuration of a turbo sensor 51 and a crank angle sensor 52 in the engine 1.

As shown in FIGS. 1 and 2, the engine 1 comprises an engine main unit 10 having a plurality of cylinders No. 1, No. 2, No. 3, and No. 4; an intake line 20 for guiding intake air to combustion chambers 18 of the engine main unit 10; an exhaust line 30 serving as a passage for exhaust gas discharged from the combustion chambers 18; a supercharger 40 having a turbine 41 placed in the exhaust line 30 and a compressor 42 placed in the intake line 20 so as to be driven by this turbine 41; the turbo sensor 51 for detecting the rotational speed of the supercharger 40; a control device 70 for controlling, based on a detection signal from the turbo sensor 51, an operating state of the engine main unit 10 that has a correlation with the rotational speed of the supercharger 40; and the crank angle sensor 52 for detecting the rotation angle of a crankshaft 5 (hereinafter referred to as the crank angle).

In this embodiment, the engine 1 is a four-cylinder diesel engine and is a four-cycle engine that repeats four strokes, i.e., intake, compression, expansion, and exhaust.

The engine main unit 10 has a cylinder block 11 and a cylinder head 12 that form the cylinders No. 1, No. 2, No. 3 and No. 4 as well as an intake manifold 15 and an exhaust manifold 16 that are connected to the cylinder head 12. The crankshaft 5 is rotatably supported by the cylinder block 11.

The intake line 20 is fluid-connected to the intake manifold 15 such that the end part on the downstream side in the intake air flow direction is in communication with the combustion chamber 18 of each of the cylinders No. 1, No, 2, No. 3, and No. 4.

In this embodiment, in the intake line 20, an air filter 21 and the compressor 42 of the supercharger 40 are provided in this order from the upstream side toward the downstream side in the intake air flow direction.

The exhaust line 30 is fluid-connected to the exhaust manifold 16 such that the end part on the upstream side in the exhaust gas flow direction is in communication with the combustion chamber 18 of each of the cylinders No. 1, No. 2, No. 3, and No. 4.

In this embodiment, in the exhaust line 30, the turbine 41 of the supercharger 40 and a muffler 31 are provided in this order from the upstream side toward the downstream side in the exhaust gas flow direction.

The supercharger 40 is for forcibly sending intake air to the combustion chamber 18 of each of the cylinders No. 1, No. 2, No. 3, and No. 4 by taking advantage of the exhaust gas energy from the engine main unit 10.

That is, the turbine 41 is configured to be rotated by the energy of exhaust gas discharged via the exhaust line 30 from the combustion chambers 18 of the engine main unit 10. The compressor 42 is connected to the turbine 41 via a rotational shaft 43 so as to rotate together with the turbine 41.

The turbo sensor 51 is electrically connected to the control device 70 and is configured to input a detection signal into the control device 70.

In this embodiment, an amplifier 60 for amplifying the detection signal of the turbo sensor 51 and performing frequency division is placed between the turbo sensor 51 and the control device 70.

The crank angle sensor 52 is electrically connected to the control device 70 and is configured to input a detection signal into the control device 70.

The control device 70 has a calculation part (CPU) 71 and a storage part 72. The storage part 72 has a ROM that stores, for example, a control program and control data; an EEPROM that stores, for example, setting values in such a state that the setting values and the like are not lost even when the power is turned off and can be rewritten; a RAM that temporarily retains data generated during calculation performed by the calculation part; and the like.

The control device 70 recognizes timings at which the cylinders No. 1, No. 2, No. 3, and No. 4 are in a top dead center (TDC) state based on detection signals of the crank angle sensor 52 and, also, makes a disconnection judgment for the turbo sensor 51 at non-top dead center timings that are within one combustion cycle of the engine main unit 10 and at which none of the cylinders No. 1, No. 2, No. 3, and No. 4 are in a top dead center state.

In detail, the aforementioned top dead center refers to the compression top dead center, and this also applies below.

At the timing of reaching a top dead center state, the control device 70 measures various timings of the engine 1 such as injection timing and valve timing. Therefore, at the top dead center timing, a higher calculation load is placed on the control device 70 than at non-top dead center timings. In consideration of this point, in this embodiment, the control device 70 is, as described above, configured to make a disconnection judgment for the turbo sensor 51 at non-top dead center timings. According to this configuration, it is possible to effectively detect a malfunction of the turbo sensor 51 while reducing a calculation load on the control device 70 as much as possible.

Preferably, as shown in FIG. 2, the crankshaft 5 is provided, with a top dead center indicator 81 for indicating the top dead center position of a reference cylinder that serves as a reference among the cylinders No. 1, No. 2, No. 3, and No. 4, and a plurality of detectors 82 positioned at equal intervals in the circumferential direction.

The control device 70 recognizes the crank angles corresponding to the respective top dead center positions of the cylinders No. 1, No. 2, No. 3, and No. 4 according to the crank angle corresponding to the top dead center position of the reference cylinder sensed by detection of the top dead center indicator 81 by the crank angle sensor 52 and according to the number of the cylinders No. 1, No. 2, No. 3, and No. 4, and, also, recognizes the current crank angle relative to the top dead center position of the reference cylinder by counting the number of the detectors 82 detected by the crank angle sensor 52 from the time of detection of the top dead center indicator 81 and thus recognizes the non-top dead center timings based on the crank angles corresponding to the top dead center positions of the cylinders No. 1, No. 2, No. 3, and No. 4 and the current crank angle.

In this embodiment, the reference cylinder is the first cylinder No. 1, and the top dead center indicator 81 is configured to indicate the top dead center position of the first cylinder No. 1.

The detectors 82 are provided to project in the radial direction on the outer circumferential part of a disc-like member 83 externally fitted to the crankshaft 5 so as not to be relatively rotatable. In this embodiment, the top dead center indicator 81 is, as shown in FIG. 2, a portion where at least one of the detectors 82 is missing.

As a matter of course, the top dead center indicator 81 may take various forms. For example, the top dead center indicator 81 may be a notch formed in the outer circumferential surface of the crankshaft 5.

The control device 70 recognizes the top dead center position of the first cylinder No. 1 based on the detection of the top dead center indicator 81 by the crank angle sensor 52. Here, the number of cylinders is stored in the control device 70 in advance, and, therefore, the control device 70 recognizes the crank angles corresponding to the top dead center positions of the second cylinder No. 2, the third cylinder No. 3, and the fourth cylinder No. 4 based on the top dead center position of the first cylinder No. 1.

Generally, not only the number of cylinders but also the firing order (in this case, firing performed in order of, for example, the first cylinder No. 1, the third cylinder No. 3, the fourth cylinder No. 4, and the second cylinder No. 2) are stored in the control device 70.

Figure 3:
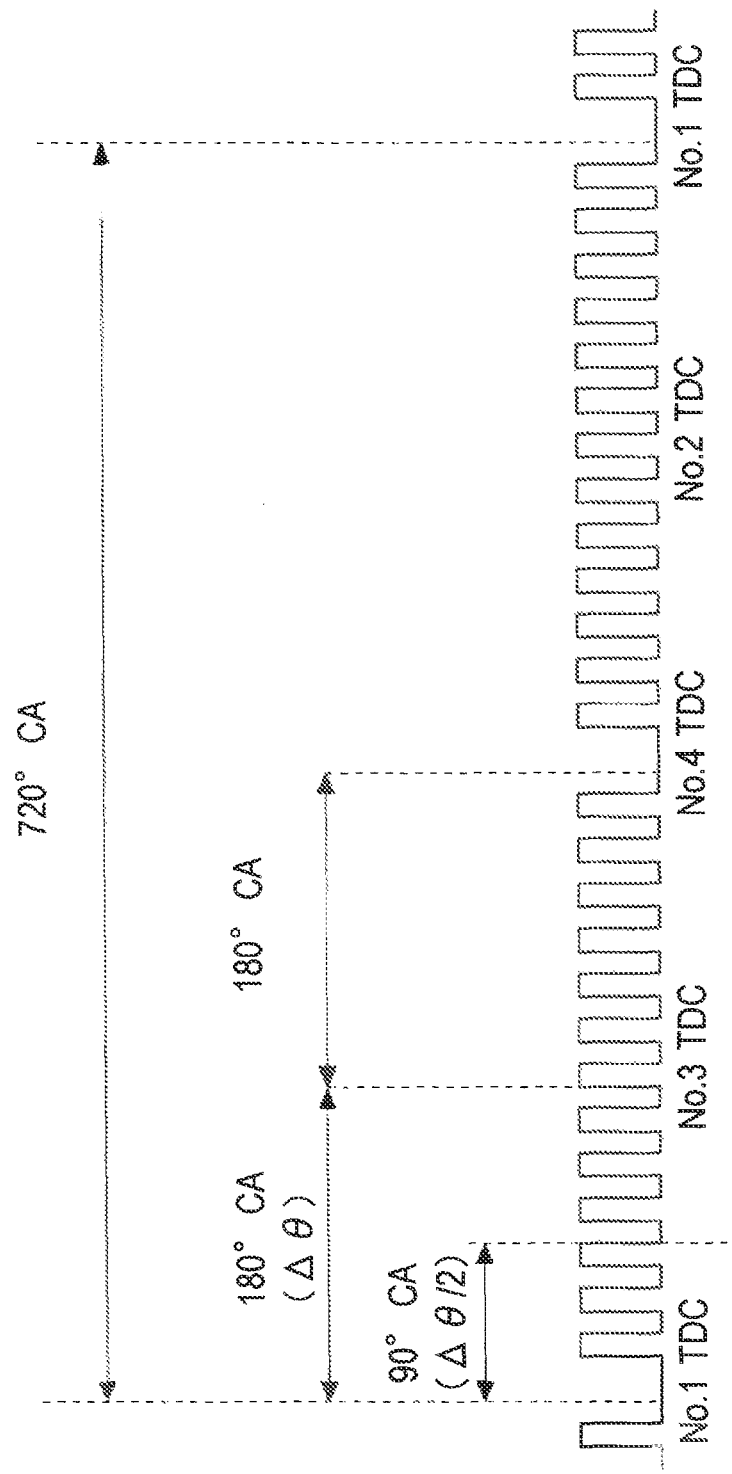
FIG. 3 is a graph relating to a detection signal that is detected by a sensor and that that indicates the output state of an engine main unit of the engine.

FIG. 3 shows a graph relating to a detection signal that indicates the output state of the engine 1 and that is detected by the crank angle sensor 52.

As stated above, in this embodiment, the engine 1 is a four-cycle engine with four cylinders, and, therefore, as shown in FIG. 3, the crankshaft 5 rotates twice during one combustion cycle of the engine 1. Thus, every time the crankshaft 5 rotates 180 degrees from the crank angle at which the first cylinder No. 1 serving as the reference cylinder is at the top dead center position, the third, cylinder No. 3, the fourth cylinder No. 4, and then the second cylinder No. 2 sequentially arrive at the top dead center position.

Figure 4:
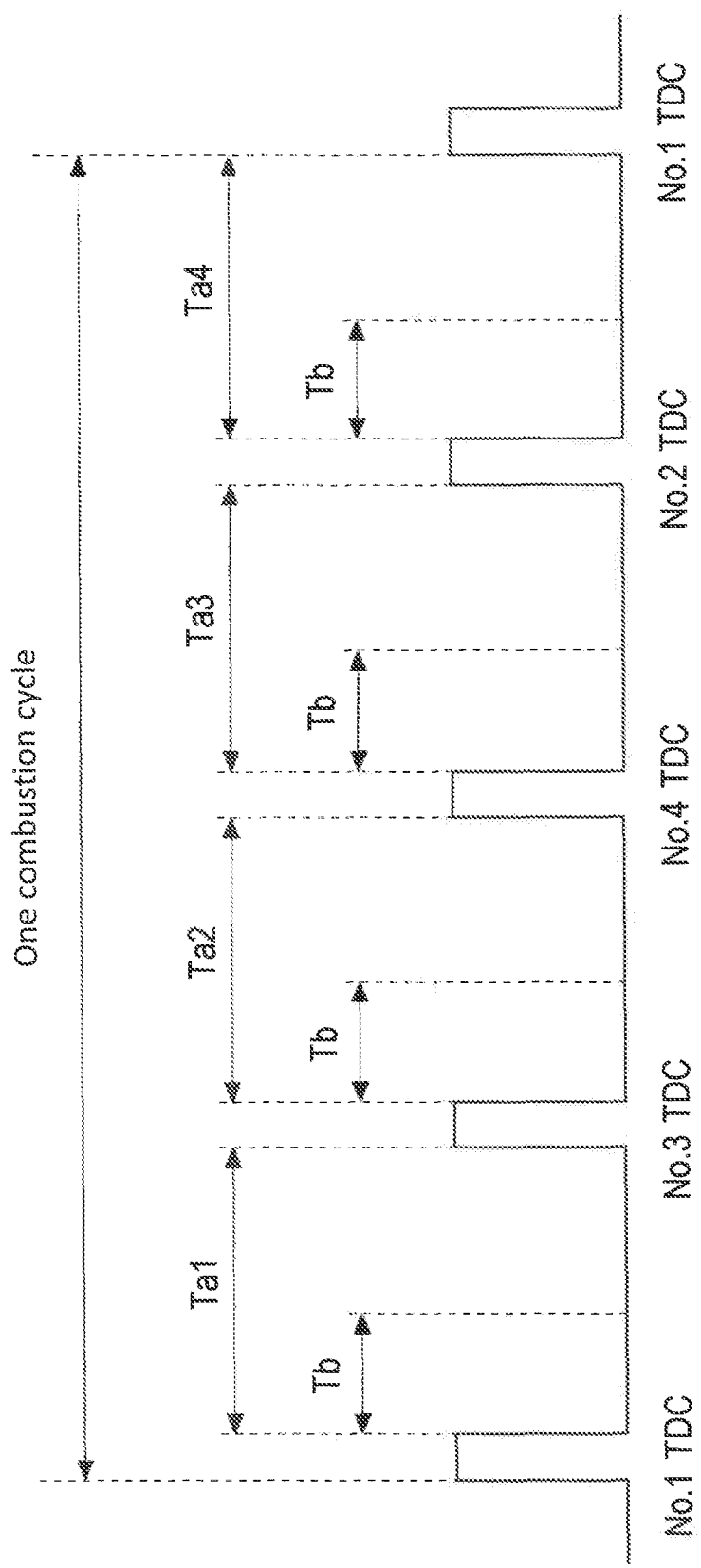
FIG. 4 is a graph indicating non-top dead center timings in the engine main unit.

FIG. 4 shows a graph indicating non-top dead center timings Ta (Ta1 to Ta4) during one combustion cycle in the engine main unit 10.

The control device 70 recognizes the current rotational angle of the crankshaft 5 relative to the top dead center position of the first cylinder No. 1 by counting the number of the detectors 82 detected by the crank angle sensor 52 from the time of detection of the top dead center indicator 81, identifies the non-top dead center timings Ta at which none of the cylinders No. 1, No. 2, No. 3, and No. 4 are in a top dead center state based on this current rotational angle and the recognized crank angles corresponding to the top dead center positions of the cylinders No. 1, No. 2, No. 3, and No. 4, and makes the disconnection judgment within the non-top dead center timings Ta.

In this embodiment, the control device 70 is configured to always make a disconnection judgment at the non-top dead center timings Ta between the respective top dead centers of the cylinders No. 1, No. 2, No. 3, and No. 4.

Specifically, the control device 70 is configured to make a disconnection judgment at the non-top dead center timing Ta1 between the top dead center of the first cylinder No. 1 and the top dead center of the third cylinder No. 3 where next combustion occurs, and then make a disconnection judgment at each of the non-top dead center timing Ta2 between the top dead center of the third cylinder No. 3 and the top dead center of the fourth cylinder No. 4 where next combustion occurs, the non-top dead center timing Ta3 between the top dead center of the fourth cylinder No. 4 and the top dead center of the second cylinder No. 2 where next combustion occurs, and the non-top dead center timing Ta4 between the top dead center of the second cylinder No. 2 and the top dead center of the first cylinder No. 1 where next combustion occurs.

In another embodiment, the control device 70 may be configured to make only once a disconnection judgment during one combustion cycle.

Specifically, for example, the control device 70 may be configured to make a disconnection judgment at the non-top dead center timing Ta1 between the top dead center of the first cylinder No. 1 and the top dead center of the third cylinder No. 3 where combustion occurs next, but not to make a disconnection judgment at the subsequent non-top dead center timing Ta2 between the top dead center of the third cylinder No. 3 and the top dead center of the fourth cylinder No. 4 where combustion occurs next, non-top dead center timing Ta3 between the top dead center of the fourth cylinder No. 4 and the top dead center of the second cylinder No. 2 where combustion occurs next, and non-top dead center timing Ta4 between the top dead center of the second cylinder No. 2 and the top dead center of the first cylinder No. 1 where combustion occurs next.

As long as the control device 70 makes a disconnection judgment at a non-top dead center timing, the control device 70 can be configured to make a disconnection judgment any number of times during one combustion cycle.

Preferably, when the deviation between the crank angle corresponding to the top dead center position of the cylinder where the latest combustion occurred and the crank angle corresponding to the top dead center position of the cylinder where combustion occurs next is defined as $\Delta\theta$, the control device 70 may be configured to make a disconnection judgment for the turbo sensor 51 at a timing at which the current crank angle is positioned within a $\Delta\theta/2$ range from the crank angle corresponding to the top dead center position of the cylinder where the latest combustion occurred.

In this embodiment, for example, as shown in FIG. 3, the deviation $\Delta\theta$ between the crank angle corresponding to the top dead center position of the first cylinder No. 1 where the latest combustion occurred and the crank angle corresponding to the top dead center positron of the third cylinder No. 3 where combustion occurs next is 180 degrees, and, therefore, the control device 70 makes a disconnection judgment for the turbo sensor 51 at a timing at which the current crank angle is between the crank angle corresponding to the top dead center position of the first cylinder No. 1 where the latest combustion occurred and the crank angle rotated 90 degrees therefrom, which corresponds to $\Delta\theta/2$.

If explained using FIG. 4, in the case of making a disconnection judgment, for example, at the non-top dead center timing Ta1 between the top dead center of the first cylinder No. 1 and the top dead center of the third cylinder No. 3 where combustion occurs next, the control device 70 makes a disconnection judgment for the turbo sensor 51 within a timing Tb that corresponds to substantially the first half of the non-top dead center timing Ta1 after the top dead center of the first cylinder No. 1.

This configuration allows the control device 70 to effortlessly and appropriately perform fuel injection amount control for adjusting the amount of fuel injected into the cylinder where combustion occurs next according to, for example, a predetermined program stored in the storage part 72 in advance.

Here, a specific method for making a disconnection judgment for the turbo sensor 51 will now be described.

In this embodiment, the engine 1 comprises engine state detection sensors for detecting physical quantities relating to operating states of the engine main unit 10. The control device 70 comprises engine operating state/supercharger correlation data for calculating an estimated rotational speed of the supercharger 40 based on the physical quantities detected by the engine state detection sensors, and the control device 70 is configured to make a disconnection judgment for the turbo sensor 51 by comparing an estimated supercharger rotational speed calculated with the engine state detection sensors and the correlation data with a measured supercharger rotational speed obtained with a detection signal of the turbo sensor 51.

In this case, physical quantities relating to operating states of the engine main unit 10, for example, may be any one of, or a combination of two or more of, the traveling speed of a vehicle to which the engine 1 is applied, the output rotational speed of a transmission included in the vehicle, the boost pressure of the engine main unit 10, the intake temperature of the engine main unit 10, the intake amount of the engine main unit 10, the exhaust temperature of the engine main unit 10, and the exhaust pressure of the engine main unit 10.

The engine state detection sensors are not particularly limited as long as they can detect corresponding physical quantities relating to operating states of the engine main unit 10.

In detail, the control device 70 makes the disconnection judgment after the start of the engine main unit 10 in the following flow. The control device 70 recognizes the start of the engine main unit 10, for example, when an operational signal by a starting means such as a key switch is inputted.

FIG. 5 shows a flowchart of a disconnection judgment procedure for the turbo sensor 51 carried out when the engine main unit 10 is in operation after start-up.

In step 11, the control device 70 senses a measured supercharger rotational speed of the supercharger 40 based on a detection signal by the turbo sensor 51.

In step 12, the control device 70 senses physical quantities relating to operating states of the engine main unit 10 based on detection signals by the engine state detection sensors.

In step 13, the control device 70 calculates an estimated supercharger rotational speed based on the engine operating state/supercharger correlation data using the sensed physical quantities relating to operating states of the engine main unit 10. The engine operating state/supercharger correlation data is stored in the storage part 72 of the control device 70 in advance.

In step 14, the control device 70 judges whether the current point in time is a non-top dead center timing or not.

If the control device 70 judges that the current point in time is not a non-top dead center timing, the process returns to the step 11.

If the control device 70 judges that the current point in time is a non-top dead center timing, the process advances to step 15.

In the step 15, the control device 70 compares the measured supercharger rotational speed with the estimated supercharger rotational speed and makes a disconnection judgment for the turbo sensor 51. In this disconnection judgment, for example, whether or not the measured supercharger rotational speed is within a permissible range relative to the estimated supercharger rotational speed is judged.

If the control device 70 judges that disconnection of the turbo sensor 51 has not occurred, the process advances to step 17.

If the control device 70 judges that disconnection of the turbo sensor 51 has occurred, the process advances to step 16.

In the step 16, the control device 70 performs predetermined control. The predetermined control will be described below.

In the step 17, the control device 70 judges whether the operation of the engine main unit 10 has ended or not.

If the control device 70 judges that the operation of the engine main unit 10 has not ended, the process advances to the step 11.

If the control device 70 judges that the operation of the engine main unit 10 has ended, the control device 70 terminates the disconnection judgment procedure.

More preferably, the crank angle sensor 52 can be used as one of the engine state detection sensors.

In this case, the control device 70 comprises, as the engine operating state/supercharger correlation data, engine/supercharger correlation data for calculating an estimated rotational speed of the supercharger 40 from the rotational speed and the fuel injection amount (load) of the engine main unit 10 detected by the engine state detection sensors, and the control device 70 makes a disconnection judgment for the turbo sensor 51 by comparing the estimated supercharger rotational speed obtained based on signals from the engine state detection sensors and the engine/supercharger correlation data with a measured supercharger rotational speed based on a signal from the turbo sensor 51.

Thus, when the crank angle sensor 52 is used also as the engine state detection sensor, it is possible to make a disconnection judgment with a reduced number of sensors.

Preferably, as shown in FIG. 2, the engine 1 can comprise a disconnection judgment circuit 90 that has a predetermined resistance value and is electrically connected to both the control device 70 and the turbo sensor 51 so as to form a closed circuit in cooperation therewith.

In this case, the control device 70 is configured to be capable of making, when the main power is ON and the engine main unit 10 is not in operation, a disconnection judgment for the turbo sensor 51 based on whether or not the resistance value of the disconnection judgment circuit 90 is at a predetermined resistance value.

For example, the control device 70 may be configured such that the control device 70 that is at a stage after it has become an active state by turning the main power ON and before a starter motor is operated to start cranking makes a disconnection judgment for the turbo sensor 51 at predetermined time intervals, when the engine main unit 10 is not in operation. At this time, whether or not the disconnection judgment circuit 90 is at the aforementioned predetermined resistance value is judged based on, for example, whether or not the value of a current that flows when a predetermined voltage is applied to the disconnection judgment circuit 90 is at a predetermined current value.

FIG. 6 shows a flowchart of a disconnection judgment procedure for the turbo sensor carried out when the engine main unit 10 is not in operation.

As shown in FIG. 6, in step 21, the control device 70 judges whether or not a predetermined time has elapsed after becoming an active state.

If the control device 70 judges that a predetermined time has not elapsed, the step 21 is repeated.

If the control device 70 judges that a predetermined time has elapsed, the process advances to step 22.

In step 22, the control device 70 applies a voltage to the disconnection judgment circuit 90.

In step 23, the control device 70 senses a measured value of the current flowing through the closed circuit based on a detection signal by an ammeter.

The ammeter is placed in advance in the disconnection judgment circuit 90.

In step 24, the control device 70 makes a disconnection judgment for the turbo sensor 51 by determining whether or not the measured current value matches a predetermined current value.

If the control device 70 judges that disconnection of the turbo sensor 51 has not occurred because the measured current value matches the predetermined current value, the process advances to step 26.

If the control device 70 judges that disconnection of the turbo sensor 51 has occurred because the measured current value does not match the predetermined current value, the process advances to step 25.

In step 25, the control device 70 performs predetermined control such as outputting an error signal.

In step 26, the control device 70 judges whether the engine main unit 10 has started or not.

If the control device 70 judges that the engine main unit 10 has not started, the process advances to step 21.

If the control device 70 judges that the engine main unit 10 has started, the disconnection judgment procedure is terminated.

Although an example has been described in which the control device 70 makes a disconnection judgment for the turbo sensor 51 at every predetermined time interval if the engine main unit 10 is not in operation, it is also possible to configure the control device 70 to make a disconnection judgment for the turbo sensor 51 every time a manually operated signal by a switch or the like is inputted into the control device 70 in a case where the engine main unit 10 is not in operation.

Here, the predetermined control will now be described.

The predetermined control may be, for example, outputting of an error signal.

That is, the control device 70 may be configured to output an error signal as the predetermined control if it senses disconnection of the turbo sensor 51.

The error signal includes a signal for notifying a user at least any of visually, aurally, and tactually the occurrence of an error, i.e., the occurrence of disconnection of the turbo sensor 51.

In this case, the engine 1 comprises a notification device that emits at least any of, for example, sound, light, and vibration. Then, if the control device 70 senses disconnection of the turbo sensor 51, the control device 70 outputs an error signal to the notification device such that the notification device operates.

This makes it easy for a user to immediately recognize disconnection of the turbo sensor 51.

In addition to, or in place of, this outputting of an error signal, it is also possible to configure the control device 70 to make changes, as the predetermined control, to basic control of the fuel injection amount.

That is, as control of an operating state of the engine main unit 10 that has a correlation with the rotational speed of the supercharger 40, the control device 70 performs fuel injection amount control for adjusting the amount of fuel injected into the cylinders No. 1, No. 2, No. 3, and No. 4 based on the rotational speed of the supercharger 40. Here, if the control device 70 senses disconnection of the turbo sensor 51 in a disconnection judgment at a non-top dead center timing, the control device 70 changes the fuel injection amount so as to supply a preset amount of fuel in place of the fuel injection amount control that is based on the rotational speed of the supercharger 40.

The preset amount of fuel may be such a predetermined amount of fuel that the engine main unit 10 nears a non-operating state, for example, such an amount that the rotational speed of the engine main unit 10 is lower than a predetermined rotational speed. According to this configuration, if the control device 70 senses disconnection of the turbo sensor 51 in a disconnection judgment at a non-top dead center timing, the control device 70 performs such fail-safe control that the engine main unit 10 is brought into a low rotational speed state or a non-operating state.

In a configuration in which the turbo sensor 51 includes first and second turbo sensors 51a and 51b, the control device 70 can be configured such that if the control device 70 senses disconnection of one turbo sensor 51a (51b) of the first and second turbo sensors 51a and 51b, the control device 70 calculates an estimated rotational speed of the one turbo sensor based on a detection value of the other turbo sensor 51b (51a) and detection values of the engine state detection sensors, and treats this calculated rotational speed as the rotational speed of the one turbo sensor 51a (51b) that has been sensed as being disconnected.

Figure 7A:
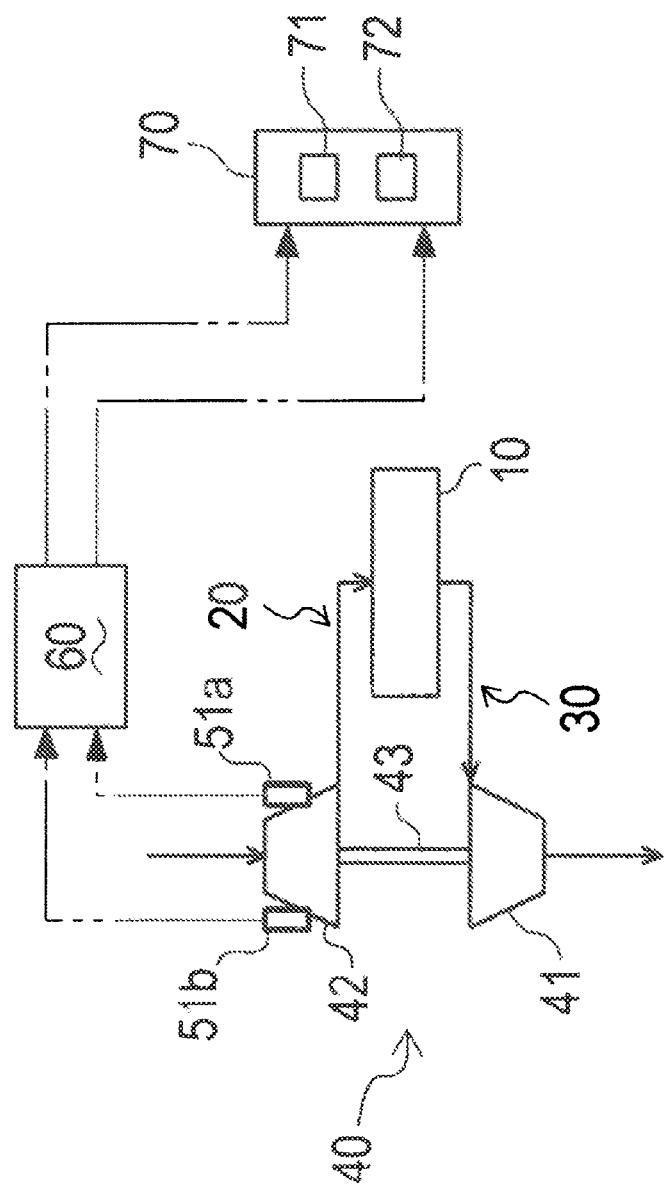
FIG. 7A is a schematic view of an engine according to a modification of the one embodiment, the engine including a single supercharger and first and second turbo sensors that detects the rotational speed of the single supercharger.
Figure 7B:
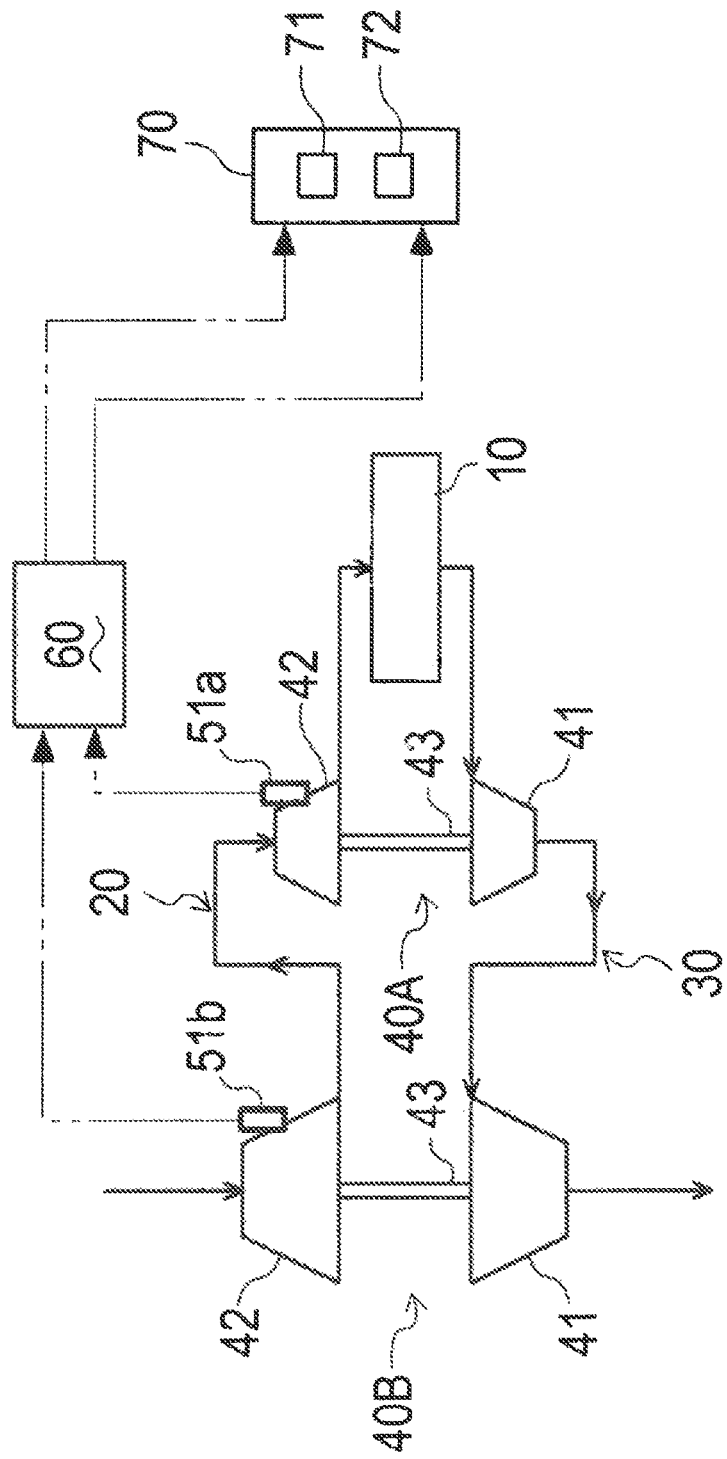
FIG. 7B is a schematic view of an engine according to another modification of the one embodiment, the engine including first and second superchargers that are arranged in series, and first and second turbo sensors that detect the rotational speeds of the first and second superchargers, respectively.

The configuration in which the turbo sensor 51 includes the first and second turbo sensors 51a and 51b encompasses a configuration in which the rotational speed of a single supercharger is detected by the first and second turbo sensors 51a and 51b (FIG. 7A) and configurations in which the rotational speeds of first and second superchargers are detected by the first and second turbo sensors 51a and 51b, respectively (FIGS. 7B and 7C).

First, as shown in FIG. 7A, a configuration in which the first and second turbo sensors 51a and 51b are provided so as to sense the rotational speed of a single supercharger 40 will now be described.

In this configuration, if the control device 70 senses disconnection of one turbo sensor 51a (51b) of the first and second turbo sensors 51a and 51b, the control device 70 calculates, based on a detection value of the other turbo sensor 51b (51a) and detection values of the engine state detection sensors, a presumed rotational speed of the one turbo sensor 51a (51b) that has been sensed as being disconnected. Then, the control device 70 obtains the rotational speed of the supercharger 40 based on the calculated presumed rotational speed of the one turbo sensor 51a (51b) and the detection value of the other turbo sensor 51b (51a).

Accordingly, the control device 70 can perform control of an operating state of the engine main unit 10 that has a correlation with the rotational speed of the supercharger 40 while suppressing a decrease in accuracy of the control.

For example, the presumed rotational speed of the one turbo sensor 51a (51b) that has been sensed as being disconnected is calculated, e.g., as follows.

That is, the control device 70 has, in addition to the engine/supercharger correlation data, engine/intake manifold pressure correlation data for calculating the pressure of the intake manifold 15 based on the rotational speed and the fuel injection amount of the engine main unit 10.

If the control device 70 senses disconnection of the one turbo sensor 51a (51b), the control device 70 calculates an estimated pressure of the intake manifold 15 based on the engine/intake manifold pressure correlation data using the rotational speed and the fuel injection amount of the engine main unit 10 that are based on signals from the engine state detection sensors, and also obtains a measured pressure of the intake manifold 15 that is based on signals from the engine state detection sensors.

If the deviation between the estimated pressure and the measured pressure of the intake manifold 15 is within a predetermined range, the control device 70 calculates an estimated supercharger rotational speed of the supercharger 40 based on the engine/supercharger correlation data using the rotational speed and the fuel injection amount of the engine main unit 10 that are based on signals from the engine state detection sensors, and presumes this calculated estimated supercharger rotational speed to be the rotational speed of the one turbo sensor 51a (51b) that has been sensed as being disconnected.

On the other hand, if the deviation between the estimated pressure and the measured, pressure of the intake manifold 15 is not within the predetermined range, the control device 70 judges whether or not the absolute value of the deviation between the estimated pressure and the measured pressure of the intake manifold 15 is below a predetermined threshold value that is set based on the fuel injection amount.

If the absolute value of the deviation is below the predetermined threshold value, the control device 70 corrects the measured supercharger rotational speed detected by the other turbo sensor 51b (51a) according to the measured pressure of the intake manifold 15 that is based on signals from the engine state detection sensors, and presumes the corrected supercharger rotational speed to be the rotational speed detected by the one turbo sensor 51a (51b) that has been sensed as being disconnected.

Next, as shown in FIG. 7B, a configuration will now be described in which first and second superchargers 40A and 40B are arranged in series, and the first and second superchargers 40A and 40B are provided with the first and second turbo sensors 51a and 51b, respectively.

In this configuration, if the control device 70 senses disconnection of one turbo sensor 51a (51b) of the first and second turbo sensors 51a and 51b, the control device 70 calculates, based on a detection value of the other turbo sensor 51b (51a) and detection values of the engine state detection sensors, a presumed rotational speed of the one turbo sensor 51a (51b) that, has been sensed as being disconnected. In this way, the control device 70 presumes the rotational speed of the supercharger 40A (40B) that should be detected by the one turbo sensor 51a (51b) that has been sensed as being disconnected.

Accordingly, the control device 70 can perform control of an operating state of the engine main unit 10 that has a correlation with the rotational speeds of the first and second superchargers 40A and 40B while suppressing a decrease in accuracy of the control.

For example, the presumed rotational speed of the one turbo sensor 51a (51b) that has been sensed as being disconnected is calculated as follows.

That is, the control device 70 has, in addition to the engine/supercharger correlation data and the engine/intake manifold pressure correlation data, engine/intake air amount correlation data for calculating the intake air amount of the engine main unit 10 based on the rotational speed and the fuel injection amount of the engine main unit 10.

If disconnection of the first turbo sensor 51a provided on the first supercharger 40A that is a high-pressure side supercharger is sensed, the control device 70 calculates respective estimated supercharger rotational speeds of the first and second superchargers 40A and 40B based on the engine/supercharger correlation data using the rotational speed and the fuel injection amount of the engine main unit 10 that are based on signals from the engine state detection sensors, and calculates the ratio of the rotational speeds of the first supercharger 40A and the second supercharger 40B.

Then, the control device 70 obtains a measured supercharger rotational speed of the second supercharger 40B that is based on a signal from the second turbo sensor 51b that has been sensed as not being disconnected, and calculates, based on the measured supercharger rotational speed of the second supercharger 40B and the rotational speed ratio, the supercharger rotational speed of the first supercharger 40A that should be detected by the first turbo sensor 51a.

On the other hand, if disconnection of the first turbo sensor 51b provided on the second supercharger 40B that is a low-pressure side supercharger is sensed, the control device 70 calculates an estimated intake air amount based on the engine/intake air amount correlation data using the rotational speed and the fuel injection amount of the engine main unit 10 that are based on signals from the engine state detection sensors.

The control device 70 obtains a measured atmospheric pressure and the temperature of the intake manifold 15 that are based on signals from the engine state detection sensors, also obtains a measured supercharger rotational speed of the first supercharger 40A that is based on a signal from the other turbo sensor 51a that has been sensed as not being disconnected, and corrects the measured supercharger rotational speed of the first supercharger 40A based on the measured atmospheric pressure and the temperature of the intake manifold 15.

The control device 70 calculates an estimated pressure of the intake manifold 15 based on the engine/intake manifold pressure correlation data using the rotational speed and the fuel injection amount of the engine main unit 10 that are based on signals from the engine state detection sensors, and also obtains a measured pressure inside the intake manifold 15 that is based on signals from the engine state detection sensors.

If the deviation between the estimated pressure and the measured pressure of the intake manifold 15 is within a predetermined range, the control device 70 calculates the flow rate of the first supercharger 40A based on the corrected supercharger rotational speed obtained by correcting the measured supercharger rotational speed of the first supercharger 40A.

If the deviation between the estimated pressure and the measured pressure of the intake manifold 15 is not within the predetermined range, the control device 70 may judge that the first supercharger 40A and/or the second supercharger 40B have failed.

The control device 70 regards a subtraction value obtained by subtracting the flow rate of the first supercharger 40A from the estimated intake air amount as the flow rate of the second supercharger 40B, and calculates a first estimated supercharger rotational speed of the second supercharger 40B based on this flow rate of the second supercharger 40B.

Also, the control device 70 calculates a second estimated supercharger rotational speed of the second supercharger 40B based on the engine/supercharger correlation data using the rotational speed and the fuel injection amount of the engine main unit 10 that are based on signals from the engine state detection sensors.

If the deviation between the first estimated supercharger rotational speed and the second estimated supercharger rotational speed of the second supercharger 40B is below a predetermined threshold value, the control device 70 presumes the average value of the first estimated supercharger rotational speed, and the second, estimated supercharger rotational speed, or the first estimated supercharger rotational speed, to be the supercharger rotational speed of the second supercharger 40B presumed as being detected by the second turbo sensor 51b that has been sensed as being disconnected.

If the deviation between the first estimated supercharger rotational speed and the second estimated supercharger rotational speed of the second supercharger 40B exceeds the predetermined threshold value, the control device 70 calculates an estimated supercharger rotational speed of the first supercharger 40A based on the engine/supercharger correlation data using the rotational speed and the fuel injection amount of the engine main unit 10 that are based on signals from the engine state detection sensors.

Then, if the absolute value of the deviation between the estimated supercharger rotational speed and the corrected supercharger rotational speed of the first supercharger 40A is below a predetermined threshold value, the control device 70 regards the first estimated supercharger rotational value of the second supercharger 40B as the supercharger rotational speed of the second supercharger 40B presumed as being detected by the second turbo sensor 51b that has been sensed as being disconnected.

If the absolute value of the deviation between the estimated supercharger rotational speed and the corrected supercharger rotational speed of the first supercharger 40A exceeds the predetermined threshold value, the control device 70 may judge that the fuel injection amount is abnormal.

Although a supercharger rotational speed that is presumed as being detected by the second turbo sensor 51b can also be calculated in the same manner as the above-described supercharger rotational speed presumed as being detected by the first turbo sensor 51a provided on the high-pressure side supercharger, it is calculated in this example by more preferable another method because the supercharger rotational speed of the high-pressure side supercharger (the first supercharger 40A) is in some cases unstable when the rotational speed of the engine main unit 10 is in a low rotational speed region.

As shown in FIG. 7C, also in a configuration in which the first and second superchargers 40A and 40B are placed, in parallel with each other in the intake line 20 and the exhaust line 30, it is possible to calculate in the same manner as above a rotational speed presumed as being detected by the turbo sensor 51a (51b) that has been sensed as being disconnected.

Preferably, the control device 70 comprises a storage means for temporarily storing a detection value of the turbo sensor 51, and the control device 70 if sensing disconnection of the turbo sensor 51 calculates an estimated rotational speed based on the latest detection value of the turbo sensor 51 that is stored in the storage means and obtained before sensing of disconnection and detection values of the engine state detection sensors, and regards this estimated rotational speed as a detection value of the turbo sensor 51.

In this embodiment, the storage means is the storage part 72 of the control device 70, and the detection value of the turbo sensor 51 is temporarily stored in the storage part 72 so as to be updated after a lapse of a specific time.

Then, if the control device 70 senses disconnection of the turbo sensor 51, the control device 70 calculates an estimated rotational speed based on the latest detection value of the turbo sensor 51 that is obtained before sensing of disconnection and stored in the storage part 72 and detection values of the engine state detection sensors obtained after sensing of disconnection, and treats this estimated rotational speed as a detection value of the turbo sensor 51, In this way, the control device 70 presumes the rotational speed of the supercharger 40 at the current point in time after sensing of disconnection.

Accordingly, the control device 70 can perform control of an operating state of the engine main unit 10 that has a correlation with the rotational speed of the supercharger 40 while suppressing a decrease in accuracy of the control.

Presumption of the rotational speed of the supercharger 40 after sensing of disconnection by the control device 70 is performed, for example, as follows.

That is, the control device 70 has the engine/supercharger correlation data and the engine/intake manifold pressure correlation data.

If the control device 70 senses disconnection of the turbo sensor 51, the control device 70 calculates an estimated supercharger rotational speed based on the engine/supercharger correlation data using the rotational speed and the fuel injection amount of the engine main unit 10 that are based on signals from the engine state detection sensors, and calculates the deviation between this estimated supercharger rotational speed and the latest detection value of the turbo sensor 51 obtained before sensing of disconnection.

If the deviation is within a predetermined range, the control device 70 after sensing of disconnection calculates an estimated pressure of the intake manifold 15 based on the engine/intake manifold pressure correlation data using the latest rotational speed and fuel injection amount of the engine main unit 10 that are based on signals from the engine state detection sensors, and also obtains a measured pressure of the intake manifold 15 that is based on signals from the engine state detection sensors.

Then, if the absolute value of the deviation between the estimated pressure and the measured pressure of the intake manifold 15 is below a predetermined threshold value, the control device 70 presumes the estimated supercharger rotational speed to be the rotational speed of the supercharger 40 at the current point in time.

Although a supercharged diesel engine is used as the engine 1 in each embodiments above, a gasoline engine or the like can be also used as long as it comprises a supercharger that forcibly sends air to combustion chambers.

DESCRIPTION OF THE REFERENCE NUMERALS 1 pump unit
5 crankshaft
10 engine main unit
18 combustion chamber
20 intake line
30 exhaust line
40 supercharger
41 turbine
42 compressor
51 turbo sensor
52 crank angle sensor
70 control device
72 storage part
81 top dead center indicator
82 detector
90 disconnection judgment circuit

The invention claimed is:

1. An engine comprising: an engine main unit having a plurality of cylinders;
an intake line for guiding intake air to combustion chambers of the engine main unit; an exhaust line serving as a passage for exhaust gas discharged from the combustion chambers;
a supercharger having a turbine placed in the exhaust line and a compressor placed in the intake line so as to be driven by the turbine;
a turbo sensor configured to detect a rotational speed of the supercharger; a control device configured to control, based on a detection signal from the turbo sensor, an operating state of the engine main unit that has a correlation with the rotational speed of the supercharger; and
a crank angle sensor configured to detect a rotation angle of a crankshaft, wherein the control device is configured to determine when the plurality of cylinders are in a top dead center state based on detection signals of the crank angle sensor and, based on the determination, make a disconnection judgment for the turbo sensor at non-top dead center timings that are within one combustion cycle of the engine main unit and at which none of the plurality of cylinders are in a top dead center state,
wherein the control device outputs an error signal as a result of the disconnection judgment or the control device adjusts a fuel injection amount of the engine main unit as a result of the disconnection judgment.

2. The engine according to claim 1,
wherein the crankshaft is provided with a top dead center indicator for indicating a top dead center position of a reference cylinder that serves as a reference among the plurality of cylinders, and a plurality of detectors positioned at equal intervals in a circumferential direction, and
wherein the control device is configured to recognize crank angles corresponding to the respective top dead center positions of the plurality of cylinders according to the crank angle corresponding to the top dead center position of the reference cylinder sensed by detection of the top dead center indicator by the crank angle sensor and according to the number of the plurality of cylinders, and, the control device is configured to recognize a current crank angle relative to the top dead center position of the reference cylinder by counting the number of the detectors detected by the crank angle sensor from the time of detection of the top dead center indicator and thus the control device is configured to recognize the non-top dead center timings based on the crank angles corresponding to the top dead center positions of the plurality of cylinders and the current crank angle.

3. The engine according to claim 2,
wherein in a case where a deviation between the crank angle corresponding to the top dead center position of the cylinder where the latest combustion occurred and the crank angle corresponding to the top dead center position of the cylinder where combustion occurs next is defined as $\Delta\theta$, the control device is configured to make the disconnection judgment for the turbo sensor at a timing at which the current crank angle is positioned within $\Delta\theta/2$ range from the crank angle corresponding to the top dead center position of the cylinder where the latest combustion occurred.

4. The engine according to claim 3, further comprising engine state detection sensors for detecting physical quantities relating to an operating state of the engine main unit, and wherein the control device has engine operating state/supercharger correlation data for calculating an estimated rotational speed of the supercharger based on the physical quantity detected by the engine state detection sensors, and the control device is configured to make the disconnection judgment for the turbo sensor by comparing an estimated supercharger rotational speed calculated with the engine state detection sensor and the correlation data with a measured supercharger rotational speed obtained with a detection signal of the turbo sensor.

5. The engine according to claim 4,
wherein the crank angle sensor also functions as one of the engine state detection sensors, and
wherein the control device has, as the engine operating state/supercharger correlation data, engine/supercharger correlation data for calculating an estimated rotational speed of the supercharger from the rotational speed and the fuel injection amount of the engine main unit detected by the engine state detection sensors, and the control device is configured to make the disconnection judgment for the turbo sensor by comparing the estimated supercharger rotational speed obtained based on signals from the engine state detection sensors and the engine/supercharger correlation data with a measured supercharger rotational speed based on a signal from the turbo sensor.

6. The engine according to claim 5, further comprising a disconnection judgment circuit that has a predetermined resistance value and is electrically connected to both the control device and the turbo sensor so as to form a closed circuit in cooperation therewith,
wherein the control device is configured to make, when the main power is ON and the engine main unit is not in operation, the disconnection judgment for the turbo sensor based on whether or not the resistance value of the disconnection judgment circuit is at a predetermined resistance value.

7. The engine according to claim 6, wherein the control device outputs an error signal if it senses disconnection of the turbo sensor.

8. The engine according to claim 7, wherein, as the control of the operating state of the engine main unit that has a correlation with the rotational speed of the supercharger, the control device performs fuel injection amount control for adjusting the amount of fuel injected into the plurality of cylinders based on the rotational speed of the supercharger, and the control device supplies a preset amount of fuel in place of the fuel injection amount control that is based on the rotational speed of the supercharger, if the control device senses disconnection of the turbo sensor in the disconnection judgment at a non-top dead center timing.

9. The engine according to claim 8, further comprising engine state detection sensors configured to detect physical quantities relating to an operating state of the engine main unit,
wherein the turbo sensor includes first and second turbo sensors, and
wherein if the control device senses disconnection of one of the first and second turbo sensors, the control device is configured to calculate an estimated rotational speed of the one turbo sensor based on a detection value of the other turbo sensor and detection values of the engine state detection sensors, and the control device is configured to treat the calculated rotational speed as the rotational speed of the one turbo sensor that has been sensed as being disconnected.

10. The engine according to claim 8, further comprising engine state detection sensors for detecting physical quantities relating to an operating state of the engine main unit,
wherein the control device comprises a storage means for temporarily storing a detection value of the turbo sensor, and if the control device senses disconnection of the turbo sensor, the control device is configured to calculate an estimated rotational speed based on the latest detection value of the turbo sensor that is stored in the storage means and obtained before sensing of disconnection and detection values of the engine state detection sensors, and regards the estimated rotational speed as a detection value of the turbo sensor.

11. The engine according to claim 1, wherein the error signal is configured to notify a user of the engine and the error signal is selected from the group consisting of: a visual signal, an audio signal, and a tactual signal.

12. The engine according to claim 1, wherein the fuel injection amount is based on a rotational speed of the supercharger.

* * * * *